United States Patent
Knees et al.

(10) Patent No.: US 8,045,560 B2
(45) Date of Patent: *Oct. 25, 2011

(54) METHOD AND SYSTEM FOR MANAGING A NETWORK HAVING MULTIPLE DOMAINS

(75) Inventors: Max C. Knees, Ft. Collins, CO (US); Eric Pulsipher, Ft. Collins, CO (US); Srikanth Natarajan, Ft. Collins, CO (US); Zhi-Qiang Wang, Ft. Collins, CO (US); Loren F. Wilson, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/461,929

(22) Filed: Aug. 28, 2009

(65) Prior Publication Data

US 2009/0316702 A1   Dec. 24, 2009

Related U.S. Application Data

(63) Continuation of application No. 10/944,894, filed on Sep. 21, 2004, now Pat. No. 7,706,382.

(60) Provisional application No. 60/540,072, filed on Jan. 30, 2004.

(51) Int. Cl.
*H04L 12/28* (2006.01)

(52) U.S. Cl. .......... 370/395.3; 370/395.53; 370/409

(58) Field of Classification Search ............... 370/389, 370/390, 392, 395.3, 395.53, 409; 709/223–226
See application file for complete search history.

(56) References Cited

U.S. PATENT DOCUMENTS

| | | | |
|---|---|---|---|
| 6,167,052 A * | 12/2000 | McNeill et al. | 370/399 |
| 6,765,914 B1 * | 7/2004 | Jain et al. | 370/395.31 |
| 6,766,482 B1 * | 7/2004 | Yip et al. | 714/717 |
| 6,771,673 B1 * | 8/2004 | Baum et al. | 370/535 |
| 7,016,351 B1 * | 3/2006 | Farinacci et al. | 370/392 |
| 7,136,351 B2 * | 11/2006 | Metin et al. | 370/230 |
| 7,194,622 B1 * | 3/2007 | Halasz et al. | 713/163 |
| 2003/0225908 A1 * | 12/2003 | Srinivasan et al. | 709/243 |
| 2004/0017816 A1 * | 1/2004 | Ishwar et al. | 370/395.53 |

* cited by examiner

*Primary Examiner* — Hassan Kizou
*Assistant Examiner* — Roberta A Shand

(57) ABSTRACT

Exemplary embodiments are directed to a system and method for managing a network having multiple domains. An exemplary method includes identifying a router interface connected with a switch; assigning a Layer 2 identifier to the interface, wherein the identifier uniquely identifies a Layer 2 domain within the network; and assigning the Layer 2 identifier to the switch.

17 Claims, 2 Drawing Sheets

METHOD AND SYSTEM FOR MANAGING A NETWORK HAVING MULTIPLE DOMAINS

CROSS REFERENCE TO RELATED APPLICATION

This application is a Continuation Application of U.S. patent application Ser. No. 10/994,894, filed on Sep. 21, 2004 now U.S. Pat. No. 7,706,382, which claims priority under 35 U.S.C. §119 to U.S. Provisional Application No. 60/540,072, filed in the U.S. PTO on Jan. 30, 2004, the entire contents of which is hereby incorporated by reference in its entirety.

BACKGROUND

Computer networks can contain a plurality of nodes, each representing a device connected within the network. The nodes can be grouped into subnetworks which include one or more virtual local area networks (VLANs).

In a network, different VLANs having different physical locations within the network can possess the same VLAN identifier. In this situation, the network management software will assume that redundant VLAN identifiers correspond to the same VLAN, irrespective of each VLAN's physical location within the network.

SUMMARY

Exemplary embodiments are directed to a method for managing a network having multiple domains. An exemplary method includes identifying a router interface connected with a switch; assigning a Layer 2 identifier to the router interface, wherein the identifier uniquely identifies a Layer 2 domain within the network; and assigning the Layer 2 identifier to the switch.

An exemplary system is disclosed for managing a network having multiple domains. The system includes a management computer configured to assign a Layer 2 identifier to a router interface of a router in a network, and configured to assign the Layer 2 identifier to a switch determined by the management computer to be connected to the router interface; and a memory, accessible by the management computer, for storing a list of nodes associated with the Layer 2 identifier.

Alternate embodiments of a system are disclosed for managing a network having multiple domains, including means for identifying a router interface connected with a switch, and for assigning a unique Layer 2 identifier to the router interface and the switch; and means for storing a list of nodes associated with the Layer 2 identifier for retrieval using the Layer 2 identifier.

A computer readable medium containing a computer program is disclosed for causing a computer to: identify a router interface connected with a switch within a network; assign a Layer 2 identifier to the router interface, wherein the identifier uniquely identifies a Layer 2 domain within the network; and assign the Layer 2 identifier to the switch.

DESCRIPTION OF THE DRAWINGS

The following detailed description of preferred embodiments can be read in connection with the accompanying drawings in which like numerals designate like elements and in which.

DETAILED DESCRIPTION

Figure 1:
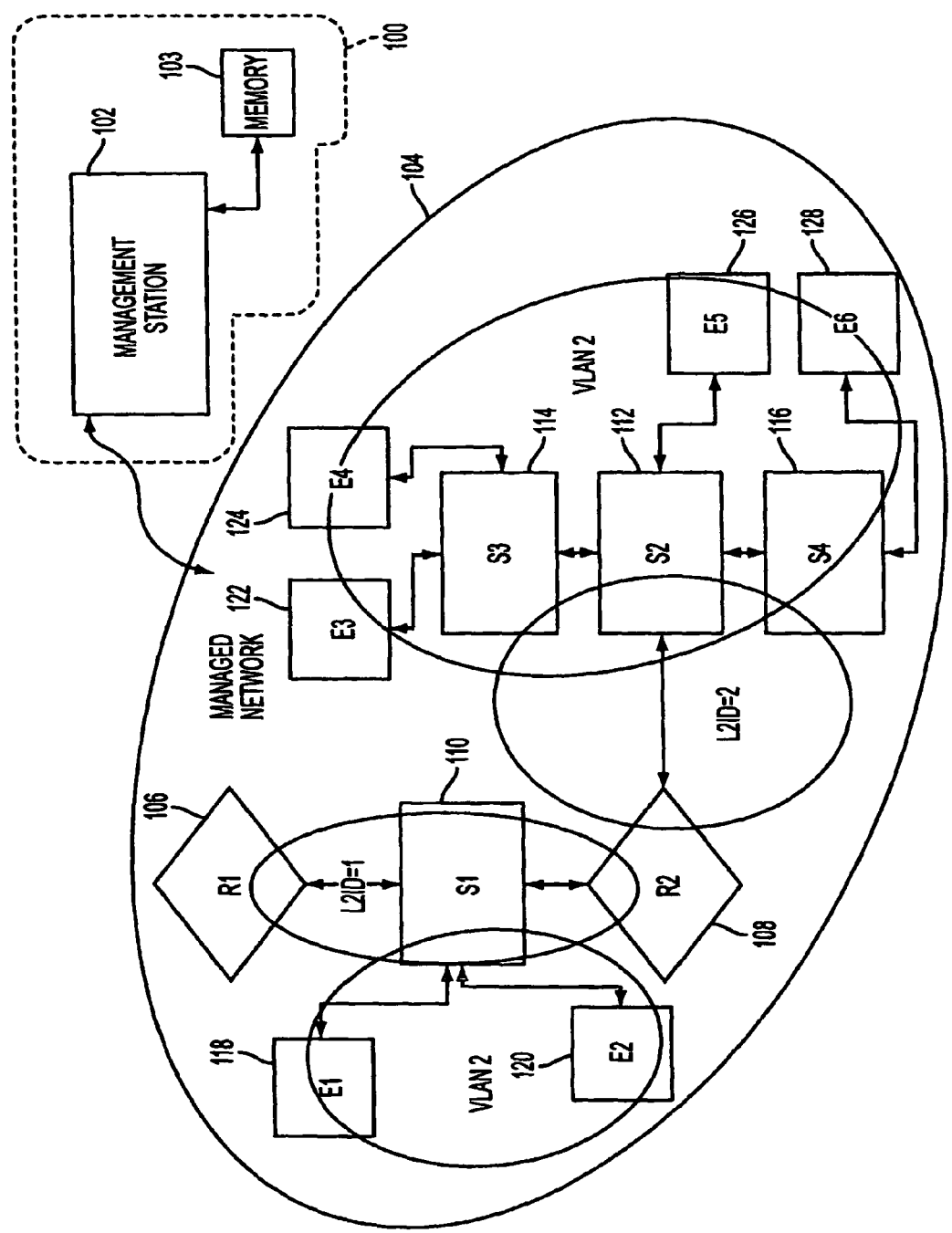
FIG. 1 shows an exemplary system for managing a network having an untagged group of nodes.

FIG. 1 shows an exemplary system 100 for managing a network having multiple domains. Each domain can include a tagged and/or an untagged group of nodes. In an exemplary embodiment, a group of nodes constitutes a VLAN. The FIG. 1 system includes means, such as a management computer of management station 102, for identifying a router interface connected with a switch, and for assigning a unique Layer 2 identifier to the router interface and the switch. Where the group of nodes constitutes a VLAN, the Layer 2 identifier can be considered a VLAN identifier.

In operation, the management computer of management station 102 can be configured to assign the Layer 2 identifier to the router interface of a router, such as router 106. The management computer can be configured to assign the same Layer 2 identifier to a switch, such as switch 110, determined by the management computer to be connected to an interface of router 106.

The system 100 can also include means, such as memory 103, for storing a list of nodes associated with the Layer 2 identifier, for retrieval using the Layer 2 identifier. The memory 103 can be accessible by the management computer of management station 102. The list of nodes associated with the Layer 2 identifier can easily be accessed using the Layer 2 identifier when addressing the memory.

An untagged group of nodes, represented by routers, switches and end nodes in the managed network 104 of the exemplary FIG. 1 embodiment, can constitute a VLAN associated with a VLAN identifier. In the FIG. 1 example, a VLAN identifier labeled "VLAN 2" is associated with multiple VLANs within the managed network 104. In this situation, exemplary embodiments are directed to retrieving network entities according to their Layer 2 proximity.

Retrieval of network entities according to their Layer 2 proximity is desired for correct VLAN grouping among plural subnetworks. By walking the connectivity between a router interface and an end-point (where an end-point is defined as, for example, either another router interface or as an access port on a switch), a Layer 2 domain can be identified. Grouping the router interface and switch devices in the domain and associating a unique identifier (e.g., a Layer 2 ID) with them, can make retrieval of these entities according to a Layer 2 ID efficient and beneficial when differentiating redundant untagged VLAN identifiers.

In the exemplary FIG. 1 system, management station 102 interfaces with network 104. The network 104 includes routers (R) labeled 106, 108 and switches (S) labeled 110, 112, 114, and 116. End nodes (E) labeled 118, 120, 122, 124, 126 and 128 are also illustrated. In the network, multiple VLANs redundantly labeled "VLAN2" are provided. In accordance with exemplary embodiments, these redundant VLAN identifiers can be differentiated using Layer 2 identifiers. For example, "Layer 2 ID-1" and "Layer 2 ID-2", as shown in FIG. 1, differentiate the two VLANs having the same "VLAN 2" identifier in each of two different Layer 2 domains.

VLAN identifiers need only be unique within a Layer 2 broadcast domain. As such, network administrators can choose to reuse VLAN identifiers in different subnets. Network management software that is managing the entire network, as described herein, is able to differentiate between the same VLAN identifier when it is used in different Layer 2 broadcast domains.

Figure 2:
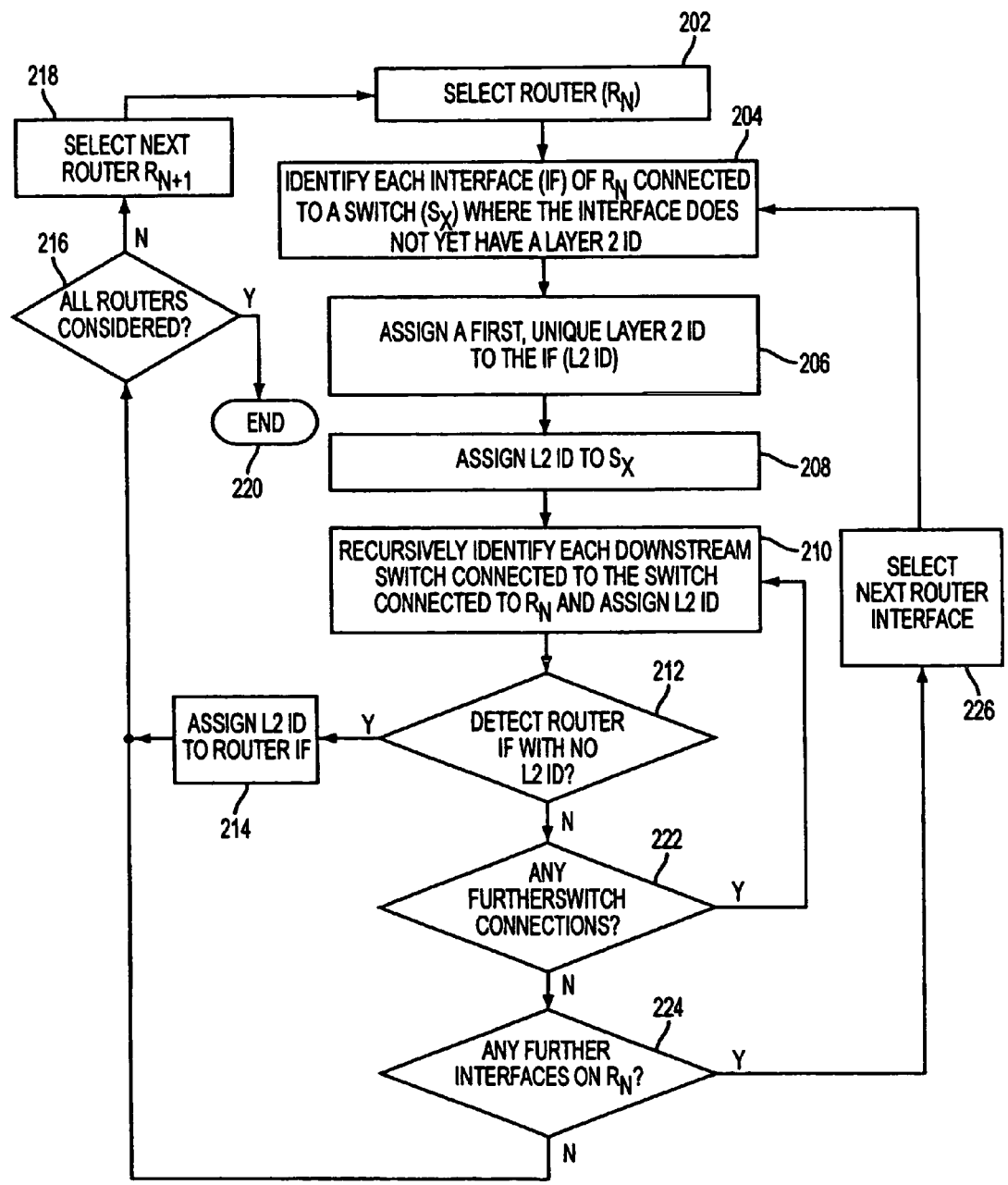
FIG. 2 shows an exemplary method for managing a network having an untagged group of nodes.

FIG. 2 illustrates an exemplary method which can be performed to differentiate redundant VLAN identifiers in a network. The FIG. 2 method can, for example, be implemented as a computer program, stored on a computer readable medium, for causing the management station 102 to configure in such a way as to execute the functionality illustrated therein.

In FIG. 2, a router $R_N$ such as router 106 is selected in block 202. In block 204, each interface (IF) of the router $R_N$ connected to a switch ($S_X$), such as switch S1 labeled 110, is identified.

In block 206, a first, unique Layer 2 identifier (ID) is assigned to the interface, such as an identifier "Layer 2 ID-1". In block 208, this same identifier Layer 2 ID-1 assigned to the switch $S_x$ connected directly to the interface of the router 106.

This process is recursively performed for each switch connected directly or indirectly (e.g., via another switch) to the router interface under consideration. The management station 102 repeatedly assigns the Layer 2 identifier to each of the multiple switches connected to the router interface. All identified switches in the domain are assigned the same Layer 2 identifier in block 210.

In the example of FIG. 1 with respect to interface of router 106 connected to switch 110, only one such switch would be identified. Thus, the interface of router 106 which is connected to switch 110, along with switch 110 and end nodes 118, 120 connected to switch 110, would be associated with the Layer 2. Thus, in identifying a router interface connected to the switch, multiple nodes connected to the router interface are identified. Any nodes identified and associated with the Layer 2 identifier can be maintained in the list of nodes maintained by memory 103.

The function of assigning the Layer 2 identifier to each of multiple switches connected to the router interface under consideration can be repeated until a predetermined condition is detected. For example, the predetermined condition can be the detection of another router interface, such as an interface of router R2, labeled 108, which is also connected to switch 110. The interface of router 108 connected to switch 110 can be associated with the Layer 2 ID-1 of switch 110, and can be used to bound the VLAN.

Alternately, or in addition, the predetermined condition can be the detection of a last switch in a path extending from the router interface. For example, switches 114 and 116 are not connected to an interface of a router, or to any downstream switches not already identified, and would each constitute the last switch in a path extending from the router interface 108. In this case, detection of switches 114 or 116 would serve as a predetermined condition for discontinuing the recursive operation of detecting switches associated with the Layer 2 identifier (LSID=2) currently under consideration.

These functions are illustrated with decision blocks 212 and 214. More particularly, in decision block 212, another router interface (e.g., of router 108) with no Layer 2 identifier is detected. The Layer 2 identifier already assigned to the domain under consideration (that is, Layer 2 ID-1) is assigned to this router interface in block 214 to bound the domain. This completes the assignment of the Layer 2 identifier to switches within the domain. Assuming all interfaces for the current router under consideration have been processed, operation can proceed to a block 216. If all such routers have been considered, as represented by block 216, the operation concludes with end block 220. Otherwise, in block 218, a next router can be selected for consideration.

Returning to block 212, if a second router interface which would bound a current VLAN is not detected, operation proceeds to decision block 222, to determine whether further switch connections exist in the current domain. If so, operation proceeds to block 210 wherein each such additional switch is assigned the Layer 2 identifier "Layer 2 ID".

If no further switch connections are detected in block 222, the VLAN is considered to be bounded, and all nodes therein are assigned the same Layer 2 ID. Operation proceeds to block 224 to determine whether any additional interfaces remain on the current router $R_N$ (e.g., router 106) under consideration. If so, the next router interface is selected in block 226 and operation returns to block 204 to repeat the foregoing process for each additional L2 connected interface of the router 106. Each additional L2 connected interface will be associated with its own Layer 2 ID. After all interfaces of the current router $R_N$ (e.g., router 106) have been considered, operation proceeds to the next router (e.g., router 108) via blocks 216 and 218. at this time, interfaces of router 108, other than the interface connected to switch 100, are evaluated.

Thus, the management station 102 repeats the identifying of a router interface and the assigning of a Layer 2 identifier to a router interface for each of multiple router interfaces associated with a router in the network. This operation is repeated for each router in the network, as desired.

Using the FIG. 2 method, entities are grouped into layer 2 domains. The following code implements functionality similar to that described with respect to FIG. 2, and can be used to program management station 102:

```
// begin main
select all routers from the network topology
foreach router {
    select router's layer-2 connected interfaces from topology
    foreach connected interface {
        if interface connected to a switch {
            assign the interface a unique layer 2 identifier // aka Layer
            2ID
            execute followSwitchConnections(switchName, Layer 2ID)
        } // fi
    } // hcaerof
} // hcaerof
// end main
// recursive function
function followSwitchConnections (switchName, Layer 2ID) {
    // begin function
    assign switch entity the Layer 2ID
    select switch's layer-2 connected interfaces from topology
    foreach connected interface {
        if connected to a remote switch interface and remote switch has
         no Layer 2ID {
            followSwitchConnections(remoteSwitchName, Layer 2ID)
        } // fi
        else if connected to a router interface and router interface has no
        Layer 2ID
        {
            assign router interface the Layer 2ID
        } // esle fi
    } // hcaerof
return
// end function
}
```

The foregoing method and system recognizes that network administrators may choose to reuse VLAN identifiers in different subnetworks. Such a feature allows differentiation between different groups of nodes using duplicate identifiers, leaving administrators with the correct information that a common identifier is not actually the same physical group of nodes.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for managing a network having multiple domains, comprising:
   identifying a router interface connected directly with a switch;
   assigning a Layer 2 identifier to the router interface connected directly with the switch, wherein the Layer 2 identifier uniquely identifies a Layer 2 domain within the network that has redundant virtual local area network (VLAN) identifiers; and
   assigning the same Layer 2 identifier to the switch that is connected directly with the router interface, wherein the Layer 2 identifier differentiates the redundant VLAN identifiers in the network.

2. The method according to claim 1, wherein the network includes plural subnetworks, each of which includes at least one VLAN.

3. The method according to claim 1, wherein an group of nodes included in the network is a VLAN associated with a VLAN identifier.

4. The method according to claim 3, wherein the VLAN identifier is associated with multiple VLANs contained within the network.

5. The method according to claim 1, wherein the identifying includes: identifying multiple nodes connected to the router interface.

6. The method according to claim 1, comprising:
   maintaining a list of nodes associated with the Layer 2 identifier in a memory accessible by a management computer.

7. The method according to claim 1, comprising:
   repeatedly assigning the Layer 2 identifier to each of multiple switches connected to the router interface.

8. A system for managing a network having multiple domains comprising:
   a management computer configured to assign a Layer 2 identifier to a router interface of a router in a network that has redundant virtual local area network (VLAN) identifiers, and configured to assign the same Layer 2 identifier to a switch determined by the management computer to be directly connected to the router interface to differentiate the redundant VLAN identifiers in the network; and
   a memory, accessible by the management computer, for storing a list of nodes associated with the Layer 2 identifier.

9. The system according to claim 8, wherein all nodes associated with the Layer 2 identifier constitute a Layer 2 domain.

10. The system according to claim 8, wherein the management computer repeatedly assigns the Layer 2 identifier to each of multiple switches downstream from the router interface.

11. The system according to claim 8, wherein a group of nodes included in the network is a VLAN associated with a VLAN identifier, the VLAN identifier being associated with multiple VLANs contained within the network.

12. A system for managing a network having multiple domains, comprising:
    means for identifying a router interface connected directly with a switch within a network that has redundant virtual-local area network (VLAN) identifiers, and for assigning a same unique Layer 2 identifier to both the router interface and the switch to differentiate the redundant VLAN identifiers in the network; and
    means for storing a list of nodes associated with the Layer 2 identifier for retrieval using the Layer 2 identifier.

13. The system according to claim 12, wherein the identifying and assigning means repeatedly assigns the Layer 2 identifier to each of multiple switches connected to the router interface.

14. The system according to claim 12, wherein the untagged group of nodes is a VLAN associated with a VLAN identifier, the VLAN identifier being associated with multiple VLANs contained in the network.

15. A non-transitory computer readable medium storing instructions for managing a network having multiple domains, the instructions being executed on a computer and comprising:
    identifying a router interface connected directly with a switch within a network that has redundant virtual local area network (VLAN) identifiers;
    assigning a Layer 2 identifier to the router interface connected directly with the switch, wherein the Layer 2 identifier uniquely identifies a Layer 2 domain within the network; and
    assigning the same Layer 2 identifier to the switch that is connected directly with the router interface, wherein the Layer 2 identifier differentiates the redundant VLAN identifiers in the network.

16. The computer readable medium according to claim 15, wherein the computer program causes a computer to repeatedly assign the Layer 2 identifier to each of multiple switches downstream from the router interface.

17. The computer readable medium according to claim 15, wherein the Layer 2 identifier is a VLAN identifier, the VLAN identifier being associated with multiple VLANs contained within a network.

* * * * *

UNITED STATES PATENT AND TRADEMARK OFFICE
CERTIFICATE OF CORRECTION

PATENT NO.          : 8,045,560 B2
APPLICATION NO.     : 12/461929
DATED               : October 25, 2011
INVENTOR(S)         : Max C. Knees et al.

Page 1 of 1

It is certified that error appears in the above-identified patent and that said Letters Patent is hereby corrected as shown below:

In column 1, line 8, delete "10/994,894," and insert -- 10/944,894, --, therefor.

In column 3, line 14, delete "ID-1 assigned" and insert -- ID-1 is assigned --, therefor.

In column 3, line 28, delete "Layer 2." and insert -- Layer 2 ID-1. --, therefor.

In column 5, line 25, in Claim 3, delete "an group" and insert -- a group --, therefor.

In column 6, lines 15-16, in Claim 12, delete "virtual-local" and insert -- virtual local --, therefor.

Signed and Sealed this
Tenth Day of July, 2012

David J. Kappos
*Director of the United States Patent and Trademark Office*